US012587112B2

(12) United States Patent
Oya et al.

(10) Patent No.: US 12,587,112 B2
(45) Date of Patent: Mar. 24, 2026

(54) BATTERY CHARGING FOR ELECTRIC VEHICLE VIA A NEUTRAL OF A POLYPHASE MOTOR WITH A CURRENT COMMAND DETERMINED BY THE NEUTRAL VOLTAGE

(71) Applicant: TOYOTA JIDOSHA KABUSHIKI KAISHA, Toyota (JP)

(72) Inventors: Ryosuke Oya, Toyota (JP); Ippei Takesue, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/616,935

(22) Filed: Mar. 26, 2024

(65) Prior Publication Data

US 2024/0348079 A1      Oct. 17, 2024

(30) Foreign Application Priority Data

Apr. 5, 2023      (JP) ................................. 2023-061743

(51) Int. Cl.
*H02M 7/537*      (2006.01)
*H02J 7/04*      (2006.01)

(52) U.S. Cl.
CPC ............... *H02M 7/537* (2013.01); *H02J 7/04* (2013.01); *H01M 2220/20* (2013.01)

(58) Field of Classification Search
CPC ..... H02M 7/533; H02M 7/537; H02M 7/5375
See application file for complete search history.

(56) References Cited

U.S. PATENT DOCUMENTS

| | | | | |
|---|---|---|---|---|
| 2010/0027305 A1* | 2/2010 | Oyobe | .................... | B60L 50/16 |
| | | | | 320/145 |
| 2020/0361323 A1* | 11/2020 | Chon | ....................... | H02M 7/44 |
| 2021/0061118 A1* | 3/2021 | Lee | ........................ | H02J 7/1492 |
| 2021/0336472 A1* | 10/2021 | Bae | ......................... | B60L 58/12 |

FOREIGN PATENT DOCUMENTS

JP      2021-175363 A      11/2021

OTHER PUBLICATIONS

G. Pellegrino, E. Armando and P. Guglielmi, "An Integral Battery Charger With Power Factor Correction for Electric Scooter," in IEEE Transactions on Power Electronics, vol. 25, No. 3, pp. 751-759, Mar. 2010 (Year: 2010).*

* cited by examiner

*Primary Examiner* — Peter M Novak
(74) *Attorney, Agent, or Firm* — Dinsmore & Shohl LLP

(57)        ABSTRACT

An electric vehicle may include a battery; an inverter; a motor; a first and second terminal configured to connect to an external power supply; a first wire connecting the first terminal to a neutral point; a second wire connecting the second terminal to the battery, a first relay disposed on the first wire; a first and second voltage sensor configured to measure a potential difference; and a controller. The controller may be configured to: calculate permissible power of the battery; calculate a first voltage value obtained by adding a first margin to a detected value by the first voltage sensor; calculate a second voltage value obtained by adding a second margin to a detected value by the second voltage sensor; and calculate a current command value to the external power supply based on the permissible power and a smaller value of the first voltage value and the second voltage value.

5 Claims, 3 Drawing Sheets

FIG. 3

(A) First Voltage Sensor 31

(B) Second Voltage Sensor 32

Voltage (V)

Va

V1

M1

M1

D1

V1L

A1

V2

M2

M2

D2

V2L

BATTERY CHARGING FOR ELECTRIC VEHICLE VIA A NEUTRAL OF A POLYPHASE MOTOR WITH A CURRENT COMMAND DETERMINED BY THE NEUTRAL VOLTAGE

CROSS-REFERENCE TO RELATED APPLICATION

This application claims priority to Japanese Patent Application No. 2023-061743 filed on Apr. 5, 2023. The entire content of the priority application is incorporated herein by reference.

BACKGROUND ART

The technology disclosed herein relates to electric vehicle comprising a battery, an inverter, and an electric motor.

Japanese Patent Application Publication No. 2021-175363 discloses a technology for boosting the power supplied from an external power source using a motor drive system and charging a battery therewith.

SUMMARY

When charging a battery, the power supplied from an external power source is required not to exceed the power the battery can accept. In case of using a required current as a power supply command to the external power source, the power supplied from the external power source needs to be calculated by measuring the supply voltage using a voltage sensor used in a voltage booster circuit. However, when the accuracy of the voltage sensor in the booster circuit is lower than the accuracy of a voltage sensor in the battery, it is necessary to provide a sufficient margin to the voltage value measured by the voltage sensor in the booster circuit, which may make the calculated supply power larger than the actual supply power. This makes a current command value lower than the one actually required and thus makes the charging time longer.

An electric vehicle disclosed herein may comprise a battery; an inverter comprising three arm circuits, wherein each of the three arm circuits comprises an upper switching element connected to a positive electrode of the battery and a lower switching element connected to a negative electrode of the battery, and the upper switching element and the lower switching element are connected in series; a motor comprising three coils, wherein in each of the three coils, one end thereof is connected to a neutral point and other end thereof is connected to a midpoint of corresponding one of the three arm circuits; a first terminal configured to connect to a positive electrode of an external power supply; a second terminal configured to connect to a negative electrode of the external power supply; a first wire connecting the first terminal to the neutral point; a second wire connecting the second terminal to the negative electrode of the battery, a first relay disposed on the first wire; a first voltage sensor configured to measure, between the first terminal and the first relay, a potential difference between the first wire and the second wire; a second voltage sensor configured to measure, between the first relay and the neutral point, a potential difference between the first wire and the second wire; and a controller configured to control the inverter to increase a voltage of power supplied from the external power supply and charge the battery. The controller may be configured to: calculate permissible power of the battery; calculate a first voltage value obtained by adding a first margin to a detected value by the first voltage sensor; calculate a second voltage value obtained by adding a second margin to a detected value by the second voltage sensor; and calculate a current command value to the external power supply based on the permissible power and a smaller value of the first voltage value and the second voltage value.

According to this configuration, the supply voltage from the external power source can be measured using the two voltage sensors. Further, the smaller voltage can be used to calculate a current command value. This allows the supply voltage to be measured more accurately than measuring the supply voltage using a single voltage sensor. Therefore, the current command value can be maximized while controlling the supply power from the external power source not to exceed the acceptable power of the battery. This prevents an unnecessarily extended charging time.

BRIEF DESCRIPTION OF THE DRAWINGS

FIG. 3 illustrates first and second voltage values V1 and V2.

DETAILED DESCRIPTION OF DETAILED DESCRIPTION

Figure 1:
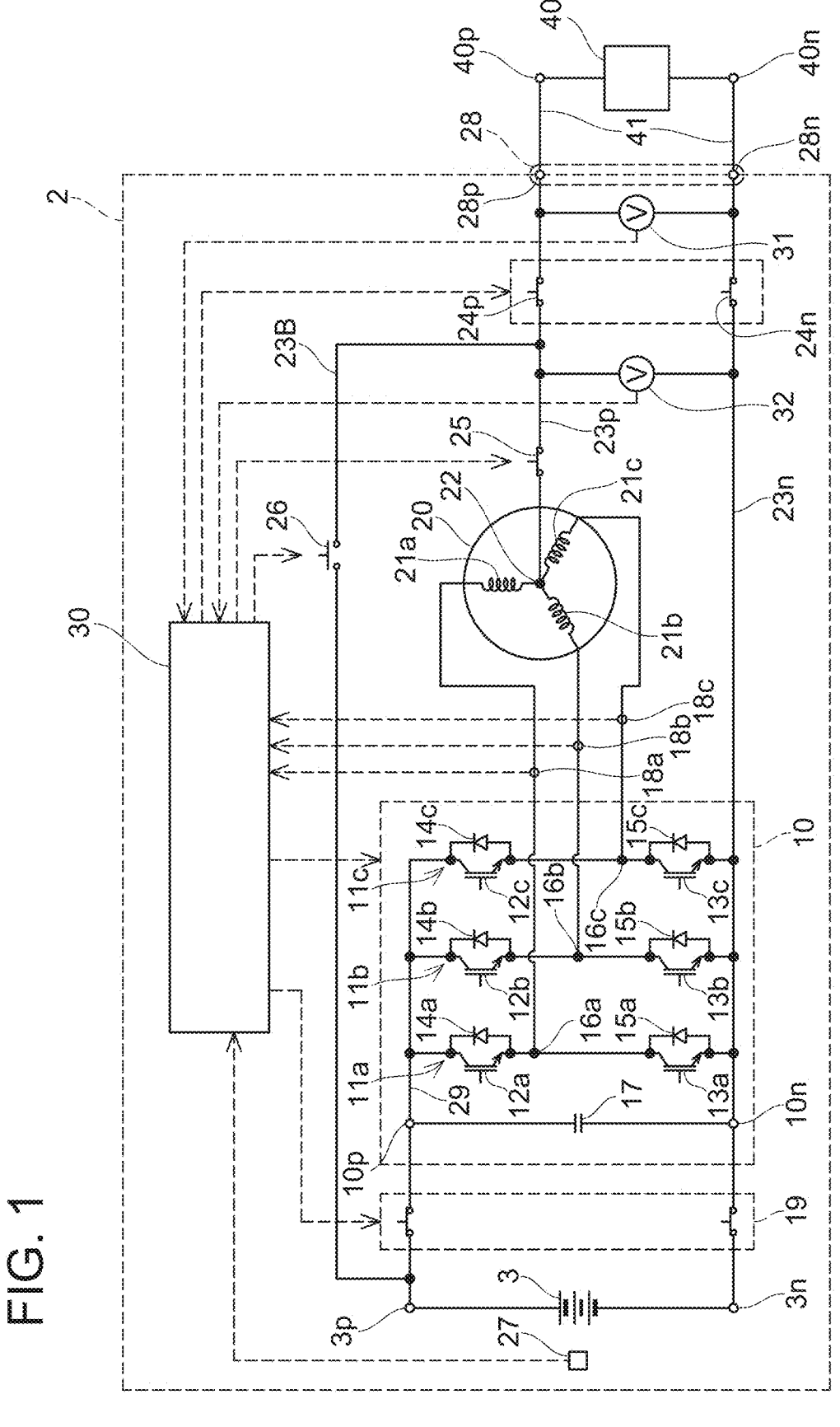
FIG. 1 is a block diagram of an electric vehicle 2 according to an embodiment.

In one embodiment of the technology disclosed herein, the electric vehicle may further comprise a second relay disposed on the first wire between the first relay and the neutral point. The second voltage sensor may be configured to measure, between the first relay and the second relay, a potential difference between the first wire and the second wire.

According to this configuration, a function of detecting whether the second relay have a trouble and a function of measuring the second voltage value can be realized by the second voltage sensor.

In one embodiment of the technology disclosed herein, the electric vehicle may further comprise a third wire connecting a connection path between the first relay and the second relay to the positive electrode of the battery; and a third relay disposed on the third wire.

According to this configuration, the positive electrode of the external power source can be directly connected to the positive electrode of the battery by the third relay. This allows the battery to be directly charged by the external power source.

In one embodiment of the technology disclosed herein, the controller may further be configured to: calculate a voltage drop value based on a resistance value of a connection path between the first voltage sensor and the second voltage sensor and the current command value; and correct the first voltage value or the second voltage value based on the voltage drop value.

According to this configuration, the effect of voltage drop occurring in the connection path between the first and second voltage sensors can be canceled. This allows for a more accurate determination on which of the first voltage value and the second voltage value is larger/smaller.

In one embodiment of the technology disclosed herein, the first margin may be different from the second margin.

Representative, non-limiting examples of the present disclosure will now be described in further detail with reference to the attached drawings. This detailed description is merely intended to teach a person of skill in the art further details for practicing aspects of the present teachings and is not intended to limit the scope of the disclosure. Furthermore, each of the additional features and teachings disclosed below may be utilized separately or in conjunction with other features and teachings to provide improved electric vehicles.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

Configuration of Electric Vehicle 2

An electric vehicle 2 according to an embodiment is described with reference to the drawings. FIG. 1 shows a block diagram of the electric vehicle 2. The electric vehicle 2 mainly includes a battery 3, an inverter 10, an electric traction motor 20, and a controller 30. The dashed arrow lines in FIG. 1 represent signal lines.

The battery 3 is connected to a DC-terminal of the inverter 10. A positive electrode 3p of the battery 3 is connected to a DC-terminal positive electrode 10p and a negative electrode 3n of the battery 3 is connected to a DC-terminal negative electrode 10n. A main relay 19 is connected between the battery 3 and the inverter 10. The main relay 19 is controlled by the controller 30.

The inverter 10 includes three sets of arm circuits 11a, 11b, and 11c. The arm circuit 11a includes an upper switching element 12a, a lower switching element 13a, a diode 14a connected in reverse parallel to the upper switching element 12a, and a diode 15a connected to the lower switching element 13a. The upper switching element 12a and the lower switching element 13a are connected in series. The upper switching element 12a is connected to the positive electrode 3p of the battery 3 via a high-potential wire 29 and the DC-terminal positive electrode 10p. The lower switching element 13a is connected to the negative electrode 3n of the battery 3 via a second wire 23n and the DC-terminal negative electrode 10n. In other words, the upper switching element 12a and the lower switching element 13a are connected in series such that the upper switching element 12a is located on the high potential side and the lower switching element 13a is located on the low potential side.

The arm circuit 11b includes an upper switching element 12b, a lower switching element 13b, a diode 14b, and a diode 15b. The arm circuit 11c includes an upper switching element 12c, a lower switching element 13c, a diode 14c, and a diode 15c. The arm circuits 11b and 11c have the same structure as the arm circuit 11a, so their description is omitted. The three sets of arm circuits 11a, 11b, and 11c are connected in parallel between the DC-terminal positive electrode 10p and the DC-terminal negative electrode 10n of the inverter 10. In other words, the three sets of arm circuits 11a, 11b, 11c are connected in parallel between the positive electrode 3p and the negative electrode 3n of the battery 3.

A capacitor 17 is connected between the DC-terminal positive electrode 10p and the DC-terminal negative electrode 10n of the inverter 10. The capacitor 17 is provided to suppress the pulsation of a current flowing in the DC terminal of the inverter 10.

Upper switching elements 12a to 12c and lower switching elements 13a to 13c of the inverter 10 are controlled as appropriate by the controller 30. When the upper and lower switching elements are turned on and off alternately, alternating currents are output from midpoints 16a, 16b, and 16c of the three sets of arm circuits 11a, 11b, and 11c, respectively.

The electric motor 20 is connected to the midpoints 16a, 16b, and 16c. The electric motor 20 includes three coils 21a, 21b, 21c. The three coils 21a, 21b, 21c are wound around a stator (not shown) of the electric motor 20. One end of each coil 21a, 21b, 21c is connected to corresponding one of the midpoints 16a, 16b, 16c. The other ends of the three coils 21a, 21b, and 21c are coupled at a single point. The point where the other ends of the three coils 21a, 21b, and 21c are coupled to each other is called a neutral point 22. The configuration in which the other ends of the coils of respective phases of the stator are connected at the neutral point 22 is called star connection and is a well-known circuit structure in three-phase AC motors.

The electric vehicle 2 further includes a first wire 23p, second wire 23n, third wire 23B, charging relays 24p and 24n, a neutral point relay 25, a bypass relay 26, a temperature sensor 27, a charging inlet 28, a first voltage sensor 31, and a second voltage sensor 32. The charging inlet 28 is provided in the body of the electric vehicle 2. The charging inlet 28 has a first terminal 28p and a second terminal 28n. A power cable 41 extending from an external DC power source 40 is connected to the charging inlet 28. Each of the first terminal 28p and the second terminal 28n are thereby connected to a positive terminal 40p and a negative terminal 40n of the external DC power source 40. The external DC power source 40 is, for example, a charging station.

The first wire 23p connects the first terminal 28p to the neutral point 22. The second wire 23n connects the second terminal 28n to the negative electrode 3n of the battery 3. The second wire 23n is also called a ground wire. The third wire 23B connects a connection path between the charging relay 24p and the neutral point relay 25 to the positive electrode 3p of the battery 3.

The charging relay 24p is disposed on the first wire 23p. The charging relay 24n is disposed on the second wire 23n. The neutral point relay 25 is disposed on the first wire 23p between the charging relay 24p and the neutral point 22. The bypass relay 26 is disposed on the third wire 23b. The bypass relay 26 directly connects the positive electrode 40p of the external DC power source 40 to the positive electrode 3p of the battery 3.

The first voltage sensor 31 is disposed between connection paths between the charging inlet 28 and the charging relays 24p and 24n. In other words, the first voltage sensor 31 is configured to measure, between the first terminal 28p and the charging relay 24p, a potential difference between the first wire 23p and the second wire 23n. By the first voltage sensor 31, whether a trouble, such as welding, is occurring in the charging relays 24p and 24n can be detected. As described below, the first voltage sensor 31 can also measure a first voltage value V1.

The second voltage sensor 32 is disposed on the connection path between the charging relay 24p and the neutral point relay 25. In other words, the second voltage sensor 32 is configured to measure, between the charging relay 24p and the neutral point relay 25, a potential difference between the first wire 23p and the second wire 23n. By the second voltage sensor 32, whether a trouble, such as welding, is occurring in the neutral point relay 25 can be detected. As described below, the second voltage sensor 32 can also measure a second voltage value V2.

The temperature sensor 27 is a sensor that measures the temperature of the battery 3. The measured value by the temperature sensor 27 is sent to the controller 30.

The electric vehicle 2 further includes three current sensors 18a, 18b, and 18c that measure the currents flowing in the three coils 21a to 21c, respectively. The measured values by the three current sensors 18a to 18c are sent to the controller 30. The controller 30 uses the measured values from the three current sensors 18a to 18c to feedback control the upper switching elements 12a to 12c and the lower switching elements 13a to 13c. Specifically, it performs current-controlled PWM control. This allows the currents flowing through the respective three coils 21a to 21c to follow target current values. The current sensors 18 may be positioned at other locations than those shown in FIG. 1. Further, instead of the current sensors 18, each switching element may include a function to measure a current.

Booster Circuit using Electric Motor 20

From a different viewpoint, it can be said that the lower switching element 13a and the diode 14a of the inverter 10 and the coil 21a constitute a booster circuit. The neutral point 22 corresponds to the input terminal, and the DC-terminal positive electrode 10p of the inverter 10 corresponds to the output terminal. The positive electrode 40p of the external DC power source 40 is connected to the neutral point 22 (input terminal) and the positive electrode 3p of the battery 3 is connected to the DC-terminal positive electrode 10p (output terminal). The negative electrode 3n of the battery 3 is connected to the DC-terminal negative electrode 40n of the external DC power source 40 via the second wire 23n.

When the lower switching element 13a is turned on for a predetermined short period of time, one end of the coil 21a is connected to the second wire 23n and a current flows through the coil 21a. At this time, electrical energy is stored in the coil 21a. When the lower switching element 13a is switched from on to off, the current stops flowing from the coil 21a to the second wire 23n. An induced electromotive force is generated in the coil 21a. Due to the induced electromotive force in the coil 21a, a current flows from the coil 21a to the DC-terminal positive electrode 10p through the diode 14a. In other words, the voltage at the DC-terminal positive electrode 10p becomes higher than the voltage at the neutral point 22. When the voltage at the DC-terminal positive electrode 10p becomes higher than the voltage at the positive electrode 3p of battery 3, a current flows from the external DC power source 40 to the battery 3, and the battery 3 is charged.

The lower switching element 13b, the coil 21b, and the diode 14b also constitute a booster circuit. The lower switching element 13c, the coil 21c, and the diode 14c also constitute a booster circuit. In other words, from a different viewpoint, the inverter 10 and the electric motor 20 can be regarded as three booster circuits connected in parallel.

The electric vehicle 2 allow the battery 3 to be charged using the external DC power source 40, which has a lower output voltage than the battery 3, by using the inverter 10 and the electric motor 20 as booster circuits.

Operation Flowchart of Charging Process

Figure 2:
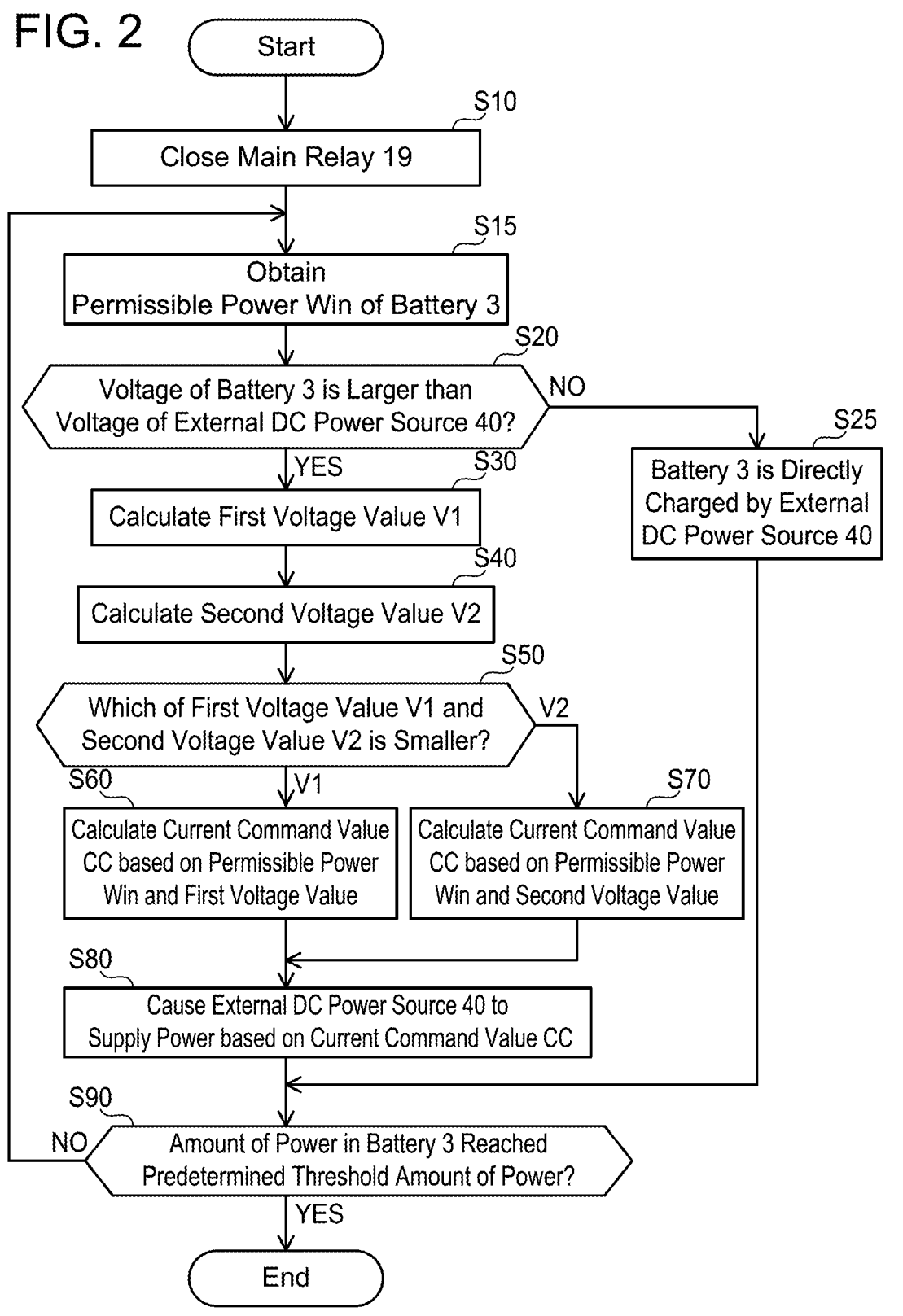
FIG. 2 is a flowchart of a charging process.

FIG. 2 shows a flowchart of a charging process. With reference to FIG. 2, the charging process by the controller 30 is explained. When the power cable 41 of the external DC power source 40 is connected to the charging inlet 28 of the electric vehicle 2 and the user turns on a charging switch (not shown), the process shown in FIG. 2 starts. The controller 30 first closes the main relay 19 to connect the inverter 10 to the battery 3 (step S10). At this stage, the charging relays 24p and 24n remain open.

In step S15, the controller 30 obtains permissible power Win of the battery 3. The permissible power Win can be calculated, for example, based on the temperature of the battery 3. The permissible power Win of the battery 3 is lower with the lower temperature of the battery 3. In order to prevent performance degradation of the battery 3 due to lithium precipitation, the battery needs to be charged with power that is equal to or lower than the permissible power Win. In other words, the permissible power Win is the upper limit of charging power.

In step S20, the controller 30 determines whether the voltage of the battery 3 is higher than the voltage of the external DC power source 40. If the voltage of the external DC power source 40 is higher (S20: NO), it is determined that a voltage boost is not required for charging. Therefore, the flow proceeds to step S25, where the controller 30 closes the charging relays 24p, 24n, and the bypass relay 26. As a result, the battery 3 is directly charged by the external DC power source 40. The flow then proceeds to step S90.

If the voltage of the battery 3 is higher (S20: YES), it is determined that a voltage boost is required for charging. Therefore, the charging relays 24p, 24n, and the neutral point relay 25 are closed. Then, the flow proceeds to step S30 to perform the above-described charging operation using the booster circuits with the electric motor 20.

Figure 3:
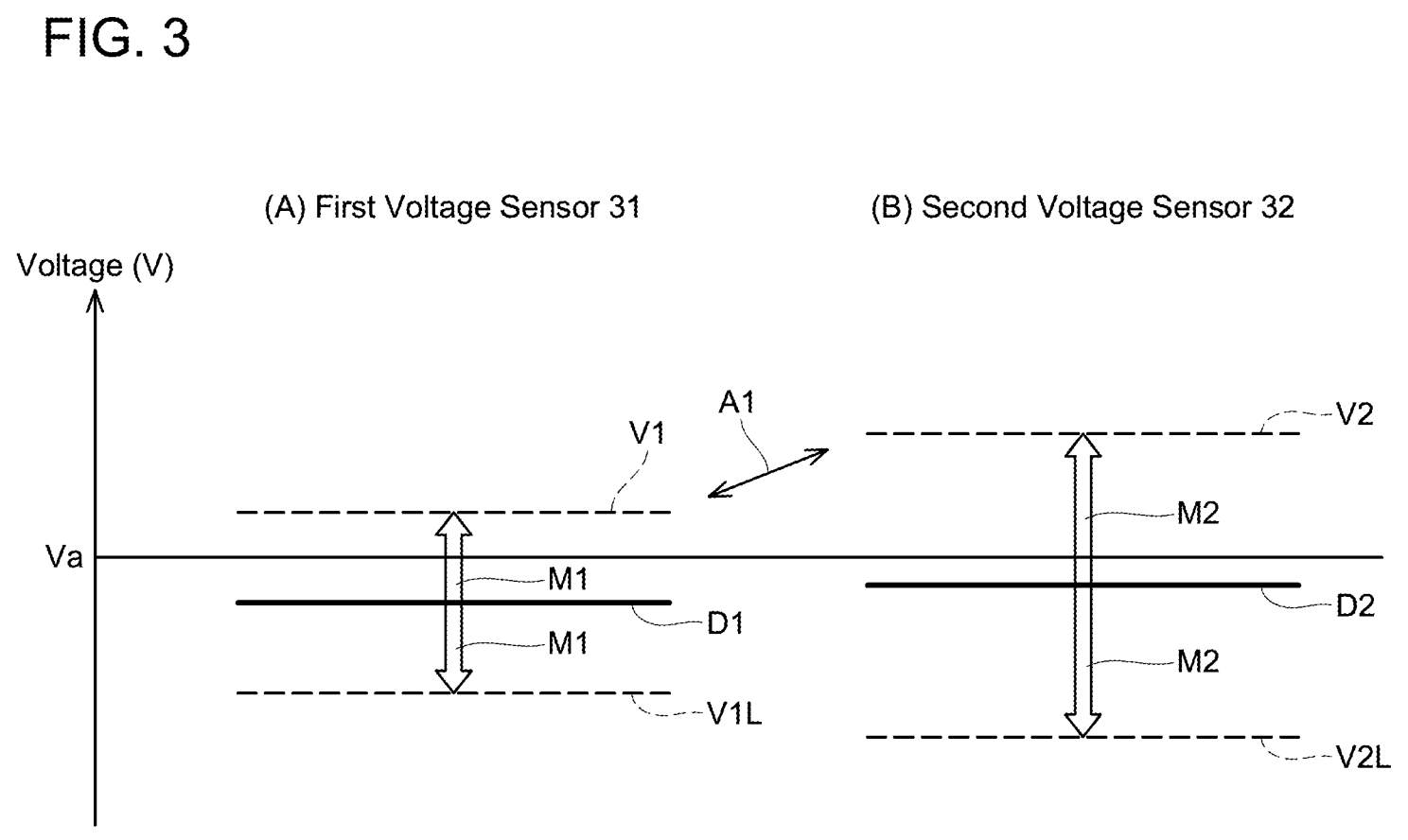

In step S30, the controller 30 calculates a first voltage value V1. As shown in (A) of FIG. 3, the first voltage value V1 is obtained by adding a first margin M1 to a detected value D1 by the first voltage sensor 31. The first voltage sensor 31 has the first margin M1 on + side and − side with respect to the detected value D1. The first margin M1 is determined by the design value of the first voltage sensor 31 and can be known in advance. The more precisely designed the first voltage sensor 31 is, the smaller the first margin M1 is. The value obtained by adding the first margin M1 to the detected value D1 is the first voltage value V1. The value obtained by subtracting the first margin M1 from the detected value D1 is a lower limit voltage value V1L. An actual voltage Va, which is the actual voltage, always falls within the range from the lower limit voltage value V1L to the first voltage value V1. The first voltage value V1, which is the upper limit value, is used as a value for calculating supply power as described below. Thus, the first voltage value V1 does not exceed the actual voltage Va even with the largest measurement error.

In step S40, the controller 30 calculates a second voltage value V2. As shown in (B) of FIG. 3, the second voltage value V2 is obtained by adding a second margin M2 to a detected value D2 by the second voltage sensor 32. The value of the first margin M1 and the value of the second margin M2 may be different from each other. In other words, the accuracy of the first voltage sensor 31 and the accuracy of the second voltage sensor 32 may be different from each other. The value obtained by subtracting the second margin M2 from the detected value D2 is a lower limit voltage value V2L. Since the second voltage value V2 is the same as the first voltage value V1 described above, its detailed explanation is omitted.

In step S50, the controller 30 determines which of the first voltage value V1 and the second voltage value V2 is smaller. If it is determined that the first voltage value V1 is smaller (S50: V1), the flow proceeds to step S60. In the example in FIG. 3, the first voltage value V1 is smaller than the second voltage value V2, so the flow proceeds to step S60 (see FIG. 3, arrow A1).

In step S60, the controller 30 calculates a current command value CC. The current command value CC is information for conveying a current value to be supplied from the external DC power source 40 to the electric vehicle 2 to the external DC power source 40. The current command value CC is calculated based on the permissible power Win and the first voltage value V1. Specifically, the calculation "CC=Win/V1" is performed. Then, the flow proceeds to S80.

If it is determined in step S50 that the second voltage value V2 is smaller (S50: V2), the flow proceeds to step S70. In step S70, the controller 30 calculates the current command value CC based on the permissible power Win and the second voltage value V2. Specifically, the calculation "CC=Win/V2" is performed. Then, the flow proceeds to S80.

In step S80, the controller 30 causes the external DC power source 40 to supply a current based on the calculated current command value CC. Thus, the battery can be charged such that the power supplied from the external DC power source 40 does not exceed the permissible power Win of the battery 3.

In step S90, the controller 30 determines whether the amount of power in the battery 3 has reached a predetermined threshold amount of power. If not (S90: NO), the flow returns to S15 and the charging continues. On the other hand, if yes (S90: YES), the controller 30 opens the charging relays 24p and 24n and terminates the charging process.

Effects

Here, the problem to be solved is described. In case of using the current command value CC to convey a power supply command to the external DC power source 40, the supply voltage of the external DC power source 40 needs to be measured by using a voltage sensor (e.g., the first voltage sensor 31, the second voltage sensor 32) in the booster circuits with the electric motor 20. This is because the power to be supplied from the external DC power source 40 needs to be calculated by multiplying the current command value CC by the supply voltage and the power to be supplied from the external DC power source 40 needs to be controlled not to exceed the permissible power Win of the battery 3. However, when the accuracy of the voltage sensor of the booster circuits is lower than that of a voltage sensor (not shown) of the battery 3, a sufficient margin needs to be given to the voltage value measured by the voltage sensor of the booster circuits, which may make the calculated supply power larger than the actual supply power. As a result, the current command value CC may be made lower than actually required and thus the charging time may be extended.

In view of the above, in the technology disclosed herein, the supply voltage from the external DC power source 40 can be measured using the two voltage sensors, namely the first voltage sensor 31 and the second voltage sensor 32.

Further, the current command value CC can be calculated using the smaller one of the first voltage value V1 with the first margin M1 added and the second voltage value V2 with the second margin M2 added. This allows for a more accurate measurement of the supply voltage than measuring it using a single voltage sensor. Therefore, the current command value CC can be maximized without allowing the supply power from the external DC power source 40 to exceed the permissible power Win. This suppresses the unnecessarily extended charging time.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

Variants

The method of calculating the first voltage value V1 (S30) and the method of calculating the second voltage value V2 (S40) may be varied. For example, a voltage drop value of a connection path between the first voltage sensor 31 and the second voltage sensor 32 may be calculated. The voltage drop value can be calculated based on a resistance value of the connection path between the first voltage sensor 31 and the second voltage sensor 32 and the current command value CC. The resistance value of the connection path can be obtained in advance, for example, by adding up resistance values of the charging relays 24p and 24n and resistance values of various circuits, which are not shown (e.g., shutdown circuit). The first voltage value V1 or the second voltage value V2 may be corrected based on the calculated voltage drop value. For example, the voltage drop value may be subtracted from the first voltage value V1 or the voltage drop value may be added to the second voltage value V2. This cancels the effect of the voltage drop occurring in the connection path between the first voltage sensor 31 and the second voltage sensor 32. Thus, it is possible to determine more accurately which of the first voltage value V1 and the second voltage value V2 is larger/smaller.

The number of voltage sensors that measure the supply voltage of the external DC power source 40 is not limited to two. N (N is a natural number greater than or equal to 3) voltage sensors can be used. In this case, a margin may be added to each of the detected values by the N voltage sensors to calculate N voltage values. The current command value CC then may be calculated by using the minimum voltage value among the N voltage values.

The margins may be added to the detected values by the voltage sensors in various manners. For example, the margins may be added in a percentage of the detected values.

The term "electric vehicle" used herein can also include a hybrid vehicle including an engine as well as a battery, a n inverter, and an electric motor. In other words, the technology according to the embodiment is also suitably applied to hybrid vehicles.

The charging relay 24*p* is an example of the first relay. The neutral point relay 25 is an example of the second relay. The bypass relay 26 is an example of the third relay.

What is claimed is:

1. An electric vehicle comprising:

a battery;

an inverter comprising three arm circuits, wherein each of the three arm circuits comprises an upper switching element connected to a positive electrode of the battery and a lower switching element connected to a negative electrode of the battery, and the upper switching element and the lower switching element are connected in series;

a motor comprising three coils, wherein in each of the three coils, one end thereof is connected to a neutral point and other end thereof is connected to a midpoint of corresponding one of the three arm circuits;

a first terminal configured to connect to a positive electrode of an external power supply;

a second terminal configured to connect to a negative electrode of the external power supply;

a first wire connecting the first terminal to the neutral point;

a second wire connecting the second terminal to the negative electrode of the battery, a first relay disposed on the first wire, a first voltage sensor configured to measure, between the first terminal and the first relay, a potential difference between the first wire and the second wire;

a second voltage sensor configured to measure, between the first relay and the neutral point, a potential difference between the first wire and the second wire; and a controller configured to control the inverter to increase a voltage of power supplied from the external power supply and charge the battery, wherein

10 the controller is configured to:

calculate permissible power of the battery;

calculate a first voltage value obtained by adding a first margin to a detected value by the first voltage sensor;

calculate a second voltage value obtained by adding a second margin to a detected value by the second voltage sensor; and calculate a current command value to the external power supply based on the permissible power and a smaller value of the first voltage value and the second voltage value.

2. The electric vehicle according to claim 1, wherein the electric vehicle further comprises a second relay disposed on the first wire between the first relay and the neutral point, and the second voltage sensor is configured to measure, between the first relay and the second relay, a potential difference between the first wire and the second wire.

3. The electric vehicle according to claim 2, wherein the electric vehicle further comprises:

a third wire connecting a connection path between the first relay and the second relay to the positive electrode of the battery; and a third relay disposed on the third wire.

4. The electric vehicle according to claim 1, wherein the controller is further configured to:

calculate a voltage drop value based on a resistance value of a connection path between the first voltage sensor and the second voltage sensor and the current command value; and correct the first voltage value or the second voltage value based on the voltage drop value.

5. The electric vehicle according to claim 1, wherein the first margin is different from the second margin.

* * * * *